United States Patent [19]

Pilla

[11] 4,157,991

[45] Jun. 12, 1979

[54] CORROSION PREVENTIVE COMPOSITION

[75] Inventor: Gabriel J. Pilla, Pennsauken, N.J.

[73] Assignee: The United States of America as represented by the Secretary of the Navy, Washington, D.C.

[21] Appl. No.: 894,771

[22] Filed: Apr. 10, 1978

[51] Int. Cl.$^2$ .................. C09D 3/66; C09D 5/08
[52] U.S. Cl. ................. 260/22 S; 106/14.26; 106/14.27; 106/14.29; 106/14.38; 106/14.41
[58] Field of Search ................. 260/22 S, 16; 106/14.26, 14.27, 14.29, 14.38, 14.41

[56] References Cited

U.S. PATENT DOCUMENTS

| | | | |
|---|---|---|---|
| 2,647,839 | 8/1953 | Zisman et al. | 106/14.41 |
| 3,080,330 | 3/1963 | Rudel et al. | 106/14.29 |
| 3,202,540 | 8/1965 | Stare et al. | 260/16 |
| 3,527,723 | 9/1970 | Stroh et al. | 260/22 S |
| 3,642,653 | 2/1972 | Northan et al. | 106/14.37 |
| 3,714,069 | 1/1973 | Northan et al. | 106/14.26 |
| 3,754,942 | 8/1973 | Moradian | 160/14.27 |

OTHER PUBLICATIONS

Chemical Abstracts, vol. 55, No. 4, Nov. 27, 1961 – p. 25290(a).

*Primary Examiner*—Ronald W. Griffin
*Attorney, Agent, or Firm*—R. S. Sciascia; Henry Hansen; Armand M. Vozzo, Jr.

[57] ABSTRACT

A coating composition for protecting metal surfaces from corrosion having controlled proportions of an alkyl ammonium alkyl phosphate and a high molecular weight petroleum sulfonate to inhibit corrosion, silicone and silicone alkyd resins to provide a physical barrier, trichlorotrifluoroethane and an aromatic hydrocarbon as solvents, and isopropyl alcohol as a coupling agent. An ethyl cellulose thickener may be added to the composition to increase its viscosity and reduce vertical run-off of the coating. The composition displaces water and moisture on the surface to be coated and deposits a clear, flexible, non-tacky film particularly resistant to abrasion.

13 Claims, No Drawings

CORROSION PREVENTIVE COMPOSITION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to new compositions of matter and more particularly to a coating composition for protecting metal surfaces from corrosion.

Corrosion of metal equipment, particularly aircraft, ships, and automobiles, is a constant concern of maintenance personnel because of the very serious problems that corrosive deterioration presents to safe and effective equipment operation. Salt laden environments and various power plant exhaust gases compound the maintenance problems because of their advanced rate of corrosive deterioration. Since the corrosive breakdown of vital metal parts will threaten the structural integrity of the equipment, corrosion control is of prime importance and a corrosion-resistant compound for coating these metal parts is highly desirable.

Paint provides an excellent barrier against corrosion. However, all painted surfaces are subject to eventual failure or breakdown at a rate depending on the type of paint used and their environment. Routine maintenance of equipment involves handling of painted surfaces that can often times cause paint to chip and scratch. Furthermore, paint film can crack during equipment performance usually in small but critical areas, leaving the metal surface exposed to corrosive reaction with the environment. Thus, a corrosion preventive composition that deposits, on painted as well as unpainted metal, a dry film coating which resists cracking, chipping, and scratching is of prime importance to effective corrosion control.

Existing corrosion preventive compounds have not adequately met these needs of effective corrosion control. Various corrosion preventives have been developed but have not been found to be completely satisfactory because of various shortcomings in their deposited film coatings. Some of the developed compounds have provided adequate corrosion protection, but have deposited a rather unsightly brown, tacky and dirt attracting film. Other compositions have deposited a relatively clear dry film which is corrosion resistant but which is soft and tends to scratch easily thereby reducing its effectiveness.

SUMMARY OF THE INVENTION

Accordingly, it is the general purpose and object of the present invention to provide a novel coating composition for protecting metallic surfaces from corrosion.

Another object of the present invention is to provide a corrosion preventive composition for coating bare metal and the damaged areas of painted metal without adversely effecting or discoloring the paint.

A further object of the present invention is to provide a coating composition for preventing corrosion which is easily applied and capable of displacing water and moisture on the surface to be coated.

Still another object of the present invention is to provide a water-displacing corrosion preventive composition that deposits a clear, flexible, non-tacky film which is resistant to abrasion and weathering, but which is easily removed with common solvents.

A still further object of the invention is to provide a clear, water-displacing corrosion preventive composition which is both economical and effective.

Briefly, these and other objects of the present invention are accomplished by a corrosion preventive composition which comprises controlled proportions of silicone alkyd resin, silicone resin, and silicone varnish; solvents including trichlorotrifluoroethane and an aromatic hydrocarbon; corrosion inhibitors including a high molecular weight petroleum sulfonate and an alkyl ammonium alkyl phosphate; and isopropyl alcohol as a coupling agent. A small percentage of ethyl cellulose may be added as a thickener to increase the viscosity of the composition and reduce vertical run-off upon application. The composition is useful as a protective coating on any metal surface, particularly cracked, damaged, or crevice areas of painted metal surfaces.

Other objects, advantages and novel features of the present invention will become apparent from the following detailed description thereof.

DESCRIPTION OF THE PREFERRED EMBODIMENT

The present invention is a water-displacing corrosion preventive composition which, when applied to metal surfaces, either painted or unpainted, air dries to deposit a clear, flexible, non-tacky coating particularly resistant to abrasion and weathering. The composition contains resinous material including a silicone alkyd resin, a silicone resin, and a silicone varnish. Small percentages of corrosion inhibitors including a high molecular weight petroleum sulfonate and an alkyl ammonium alkyl phosphate, a solvent mixture of an aromatic hydrocarbon and trichlorotrifluoroethane, and isopropyl alcohol as a coupling agent.

A small percentage of ethyl cellulose, typically less than 0.5 weight percent, may be added to the composition as a thickener to increase its viscosity and prevent vertical run-off of the composition when applied. A suitable thickener is Ethycell T-200 manufactured by Hercules Powder.

The silicone alkyd resin, the silicone varnish and the silicone resin employed according to the present invention combine in the composition to serve as the primary film-forming agents and to provide the coating with important physical characteristics. The silicone alkyd resin in the formulation offers high temperature strength, hardness and abrasion resistance and is characterized by a solids content of about 50 weight percent, a minimum phthalic anhydride content of approximately 20 weight percent, and a minimum oil content, preferably linseed for its drying qualities, of about 25 percent. One suitable silicone alkyd resin is Varkyd 385-50E, manufactured by McCloskey Varnish Company.

The silicone varnish is a clear, air-drying liquid having a silicone solids content of approximately 10%, a solvent content of toluene-petroleum spirits and a viscosity of approximately 1 centipoise (Brookfield RVF) at 77° F. The silicone resin employed in the present invention is a hard unbodied resin with an abundance of terminal hydroxyl groups. The silicone resin is characterized by a solids content of approximately 60%, a solvent content of xylene, an average specific gravity of 1.06 at 77° F., and a viscosity range of 15-40 cps (Brookfield RVF) at 77° F. Suitable silicone varnish and silicone resin are those manufactured by General Electric, Numbers DF-88 and SR-82, respectively.

The petroleum sulfonate and the alkyl ammonium alkyl phosphate which are employed according to the present invention serve as corrosion inhibitors providing chemical protection for the metal substrate. The small percentages of these inhibitors offer sufficient corrosion retardation without adversely effecting the desirable film properties provided by the resins. The petroleum sulfonate is a neutral barium dinonylnaphthalene sulfonate having a molecular weight of about 1000 and an average specific gravity of unity at 60° F. A suitable sulfonate is NA-SUL BSN, manufactured by R. T. Vanderbilt Company. Other high molecular weight petroleum sulfonates, particularly those of sodium and ammonium, work equally well as corrosion inhibitors in the present invention. A suitable alkyl ammonium phosphate is RP-2, manufactured by the DuPont Company.

The trichlorotrifluoroethane and aromatic hydrocarbon both serve in the composition of the present invention as solvents for promoting water displacement, assisting leveling of the compound, controlling drying time, and solubilizing the thickening agent. Furthermore, together with the isopropyl alcohol, which acts as a coupling agent, the trichlorotrifluoroethane and aromatic hydrocarbon facilitate the compatability of the remaining ingredients.

A suitable trichlorotrifluoroethane is Freon TF, manufactured by the DuPont Company. The aromatic hydrocarbon is a petroleum distillate having a boiling range between 365° F. and 410° F., a minimum flash point of 145° F., and a specific gravity range of 0.89–0.90 at 60° F. A suitable aromatic hydrocarbon is Solvent G, manufactured by the AMSCO Division of Union Oil Company of California. The isopropyl alcohol has a boiling range between 81.3° C. and 83.0° C., a specific gravity range of 0.7862–0.7873 at 20° C., and a maximum water content of 0.4 percent. A suitable isopropyl alcohol is that set forth in federal specification TT-I-735a, Grade B.

The drying time of the film coating of the present invention is controllable by varying the proportion of solvents on the basis of their evaporation rates. However, it should be noted that speeding up the drying time of the film coating will reduce the ability of the composition to displace water and may adversely effect the overall compatability of the ingredients thereof. Therefore, the drying time should be controlled so that water-displacement occurs before the film coating forms over surface-water droplets and entraps them.

One effective example of the corrosion preventive composition is set forth below on a weight percent basis.

TABLE I

| Ispopropyl alcohol | 4.6% |
| --- | --- |
| Aromatic hydrocarbon | 21.2% |
| Trichlorotrifluoroethane | 28.6% |
| Ethyl cellulose | 0.4% |
| Barium sulfonate | 4.0% |
| Alkyl ammonium alkyl phosphate | 1.0% |
| Silicone varnish | 5.1% |
| Silicone resin | 5.1% |
| Silicone alkyd resin | 30.0% |

The foregoing corrosion preventive composition is prepared by first mixing the isopropyl alcohol and the solvents, added singly in the order listed above, while stirring. The ethyl cellulose is then added to the solvent mixture by slowly sifting it into the mix while constantly stirring to avoid lumping. Approximately 15 to 20 minutes mixing time is necessary to dissolve the ethyl cellulose powder. Once the ethyl cellulose is dissolved in solution, the remaining ingredients are added in the sequence listed above while continuously stirring. After adding each ingredient, allow 5 minutes of mixing time after which the solution should be checked for weight loss due to solvent evaporation. Additional trichlorotrifluoroethane should be used to make up the difference in weight.

The film coating deposited by the corrosion preventive composition is colorless so as not to cosmetically deface the protected surface. However, coloration of the coating may be provided by adding an appropriate coloring agent to the composition. For example, an oil blue dye was added to the foregoing composition (2.5 miligrams per 100 milileters) after blending the solvents, for application discernability.

It should be noted that a pigmented coating composition according to the present invention would be useful as a paint substitute, either for original coating or for touch-up applications. The water-displacing quality of the composition would eliminate elaborate surface preparation now required, and its reduced toxicity over currently used paint systems, such as polyurethane, would make use of the present invention more advantageous.

Application of the coating composition to the protected surface can be by conventional procedures, such as spraying or painting. Priming of the surface is not required, but recommended before application.

The corrosion preventive composition may be packaged in a pressurized spray container using dichlorodifluoromethane (Freon-12) as a propellant. Effective spray application of the composition is achieved by combining 69% by volume of the corrosion preventive composition as listed in Table I and 31% by volume of the propellant in a 16 ounce pressurized spray container.

While the film coating of the composition exhibits excellent adhesion to both painted and unpainted metal surfaces, the coating is removable by wiping the surface with a solvent-dampened cloth. Suitable solvents for removing the coating include methyl ethyl ketone, dry cleaning solvent, toluol, and aliphatic naphtha. The coating is completely removed with the recommended solvents and require no special surface preparation for subsequent paint application or refinishing.

Therefore, some of the many advantages of the present invention should now be apparent. For example, a corrosion preventive composition is disclosed which is easily applied to metallic surfaces, either painted or unpainted, and which is capable of displacing water and moisture on the surface to be protected. The applied composition air dries to deposit a clear, flexible, non-tacky film coating that is resistant to abrasion and weathering but which is easily removed with common cleaning solvents.

Obviously, many modifications and variations of the present invention are possible in light of the above teachings. It is therefore to be understood that, within the scope of the appended claims, the invention may be practiced otherwise than as specifically described.

What is claimed is:

1. A corrosion preventive composition for use in coating metallic surfaces with a clear, flexible, non-tacky film particularly resistant to abrasion, comprising:

film-forming agents including a silicone alkyd resin having a solids content of about 50 weight percent, a minimum phthalic anhydride content of about 20 weight percent, and a minimum oil content of about 25 weight percent, a silicone resin having an abundance of terminal hydroxyl groups and a solids content of about 60 weight percent dissolved in xylene, and a silicone varnish having a solids content of about 10 weight percent dissolved in toluene-petroleum spirits;

corrosion inhibitors including a high molecular weight petroleum sulfonate and an alkyl ammonium alkyl phosphate;

solvents including an aromatic hydrocarbon and trichlorotrifluoroethane; and a coupling agent consisting essentially of isopropyl alcohol.

2. A corrosion preventive composition according to claim 1, which further comprises:

an effective amount of ethyl cellulose for thickening said composition to prevent vertical run-off upon coating.

3. A corrosion preventive composition according to claim 2, wherein said petroleum sulfonate is selected from the group consisting of barium sulfonate, sodium sulfonate, and ammonium sulfonate.

4. A corrosion preventive composition according to claim 3, wherein said petroleum sulfonate is barium sulfonate.

5. A corrosion preventive composition according to claim 2, which further comprises:

an effective amount of a coloring agent for imparting a desired tint to said composition.

6. A corrosion preventive composition according to claim 2 wherein said effective amount of ethyl cellulose is about 0.4 weight percent of the composition.

7. A corrosion preventive composition according to claim 1, further comprising:

a propellant consisting essentially of dichlorodifluoromethane for packaging said composition in a pressurized spray container.

8. A corrosion preventive composition according to claim 1, wherein:

said resinous material constitutes about 40 weight percent of the composition;

said corrosion inhibitors constitute about 5 weight percent of the composition;

said solvents constitute about 50 weight percent of the composition; and said coupling agent constitutes about 4.6 weight percent of the composition.

9. A corrosion preventive composition for coating metallic surfaces, consisting essentially of:

about 40 weight percent of film-forming agents consisting essentially of about 30 weight percent of a silicone alkyd resin having a solids content of about 50 weight percent, a minimum phthalic anhydride content of about 20 weight percent, and a minimum oil content of about 25 weight percent, about 5 weight percent of a silicone resin having an abundance of terminal hydroxyl groups and a solids content of about 60 weight percent dissolved in xylene, and about 5 weight percent of a silicone varnish having a solids content of about 10 weight percent dissolved in toluene-petroleum spirits;

about 5 weight percent of corrosion inhibitors consisting essentially of about 4 weight percent of a high molecular weight petroleum sulfonate and about 1 weight percent of an alkyl ammonium alkyl phosphate;

about 50 weight percent of solvents consisting essentially of about 21.2 weight percent of an aromatic hydrocarbon and about 28.6 weight percent of trichlorotrifluoroethane;

about 4.6 weight percent of a coupling agent consisting essentially of isopropyl alcohol; and about 0.4 weight percent of a thickening agent consisting essentially of ethyl cellulose.

10. A corrosion preventive composition according to claim 9, wherein said petroleum sulfonate is selected from a group consisting of barium sulfonate, sodium sulfonate, and ammonium sulfonate.

11. A corrosion preventive composition according to claim 10, wherein said petroleum sulfonate is barium sulfonate.

12. A corrosion preventive composition according to claim 9, which further comprises:

an effective amount of a coloring agent for imparting a desired tint to said composition.

13. A corrosion preventive composition according to claim 12, further comprising:

a propellant consisting essentially of dichlorodifluoromethane for packaging said composition in a pressurized spray container.

* * * * *